United States Patent
Luo et al.

(10) Patent No.: US 7,464,024 B2
(45) Date of Patent: Dec. 9, 2008

(54) CHINESE CHARACTER-BASED PARSER

(75) Inventors: Xiaoqiang Luo, Ardsley, NY (US); Robert Todd Ward, Croton on Hudson, NY (US)

(73) Assignee: International Business Machines Corporation, Armonk, NY (US)

(*) Notice: Subject to any disclaimer, the term of this patent is extended or adjusted under 35 U.S.C. 154(b) by 801 days.

(21) Appl. No.: 10/826,707

(22) Filed: Apr. 16, 2004

(65) Prior Publication Data
US 2005/0234707 A1 Oct. 20, 2005

(51) Int. Cl.
*G06F 17/27* (2006.01)
(52) U.S. Cl. .......................................... 704/9
(58) Field of Classification Search ...................... None
See application file for complete search history.

(56) References Cited
OTHER PUBLICATIONS

Xue et al ("Building a Large-Scale Annotated Chinese Corpus", Proceedings of the 19th International Conference on Computational Linguistics, 2002).*

Luo ("A Maximum Entropy Chinese Character-Based Parser", Proceedings of the 2003 Conference on Empirical Methods in Natural Language Processing, Jul. 2003, pp. 192-199).*

* cited by examiner

*Primary Examiner*—David R. Hudspeth
*Assistant Examiner*—Samuel G Neway
(74) *Attorney, Agent, or Firm*—Duke W. Yee; Anne Dougherty; Mari A. Stewart

(57) ABSTRACT

A parser is provided that parses a Chinese text stream at the character level and builds a syntactic structure of Chinese character sequences. A character-based syntactic parse tree contains word boundaries, part-of-speech tags, and phrasal structure information. Syntactic knowledge constrains the system when it determines word boundaries. A deterministic procedure is used to convert word-based parse trees into character-based trees. Character-level tags are derived from word-level part-of-speech tags and word-boundary information is encoded with a positional tag. Word-level parts-of-speech become a constituent label in character-based trees. A maximum entropy parser is then built and tested.

16 Claims, 3 Drawing Sheets

CHINESE CHARACTER-BASED PARSER

BACKGROUND OF THE INVENTION

1. Technical Field

The present invention relates to data processing and, in particular, to parsing Chinese character streams. Still more particularly, the present invention provides word segmentation, part-of-speech tagging and parsing for Chinese characters.

2. Description of Related Art

There are many natural language processing (NLP) applications, such as machine translation (MT) and question answering systems, that use structural information of a sentence. As word segmentation is often the first step in a chain of steps for processing text, word segmentation greatly affects the results of subsequent steps. A parser is a software or hardware module that analyzes a text stream and breaks the text into constituent parts. In English and other phonetic languages, text is mostly made up of words, which are strings of characters delineated by spaces. Because English text, for example, is naturally delineated by spaces, breaking the text stream into words is a rather trivial task. However, in languages that use ideographic or pictographic character sets, such as Chinese, text is mostly made up of characters that are not delineated by spaces. An English sentence "This is a sentence" would be written as "Thisisasentence" in Chinese, with Chinese characters instead of the English characters.

The Chinese Treebank (CTB), available from the Linguistic Data Consortium (LDC) in the University of Pennsylvania, is a corpus of segmented Chinese words annotated by part-of-speech, grammatical structure, and anaphora relation. In the first release, the CTB had about 100,000 words. The latest version (Version 4,0), released in March of 2004, contains about 400,000 words. As there are no word boundaries in written Chinese text, CTB is manually segmented into words and then labeled. Current parsers operate at word-level with the assumption that input sentences are pre-segmented.

Studies show that segmentation agreement between two native speakers is about upper 70% to lower 80%. The agreement between multiple human subjects is even lower. The reason for disagreement is that human subjects may differ in segmenting things like personal names (i.e., whether family and given names should be one or two words), number and measure units, and compound words, although these ambiguities do not change a human being's understanding of a sentence. Low agreement between humans directly affects evaluation of a machine's performance, as it is difficult to define a gold standard. This does not necessarily imply that machines cannot segment sentences more consistently than humans. Indeed, if a model is trained with consistently segmented data, a machine may do a better job in "remembering" word segmentations.

The solutions published so far utilize information at the lexical level. Some solutions rely on a word dictionary. Other solutions make use of word or word-based n-gram statistics. Still other solutions combine the two sources of information. While a certain level of success has been achieved, these methods ignore syntactic knowledge or constraints.

SUMMARY OF THE INVENTION

A parser is provided that parses a Chinese text stream at the character level and builds a syntactic structure of Chinese character sequences. A character-based syntactic parse tree contains word boundaries, part-of-speech tags, and phrasal structure information. Syntactic knowledge constrains the system when it determines word boundaries. A deterministic procedure is used to convert word-based parse trees into character-based trees. Character-level tags are derived from word-level part-of-speech tags and word-boundary information is encoded with a positional tag. Word-level parts-of-speech become a constituent label in character-based trees. A maximum entropy parser is then built and tested.

BRIEF DESCRIPTION OF THE DRAWINGS

The invention itself, as well as a preferred mode of use, further objectives and advantages thereof, will best be understood by reference to the following detailed description of an illustrative embodiment when read in conjunction with the accompanying drawings, wherein.

DETAILED DESCRIPTION OF THE EXEMPLARY EMBODIMENT

Figure 1:
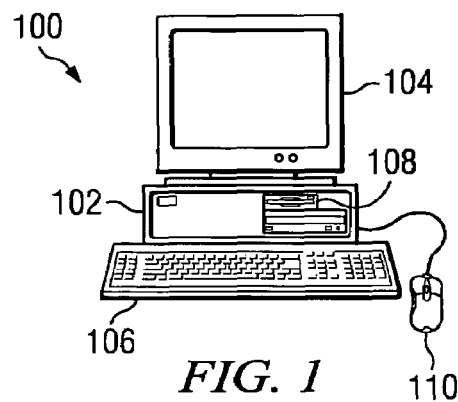
FIG. 1 is a pictorial representation of a data processing system in which the exemplary aspects of the present invention may be implemented.
Figure 2:
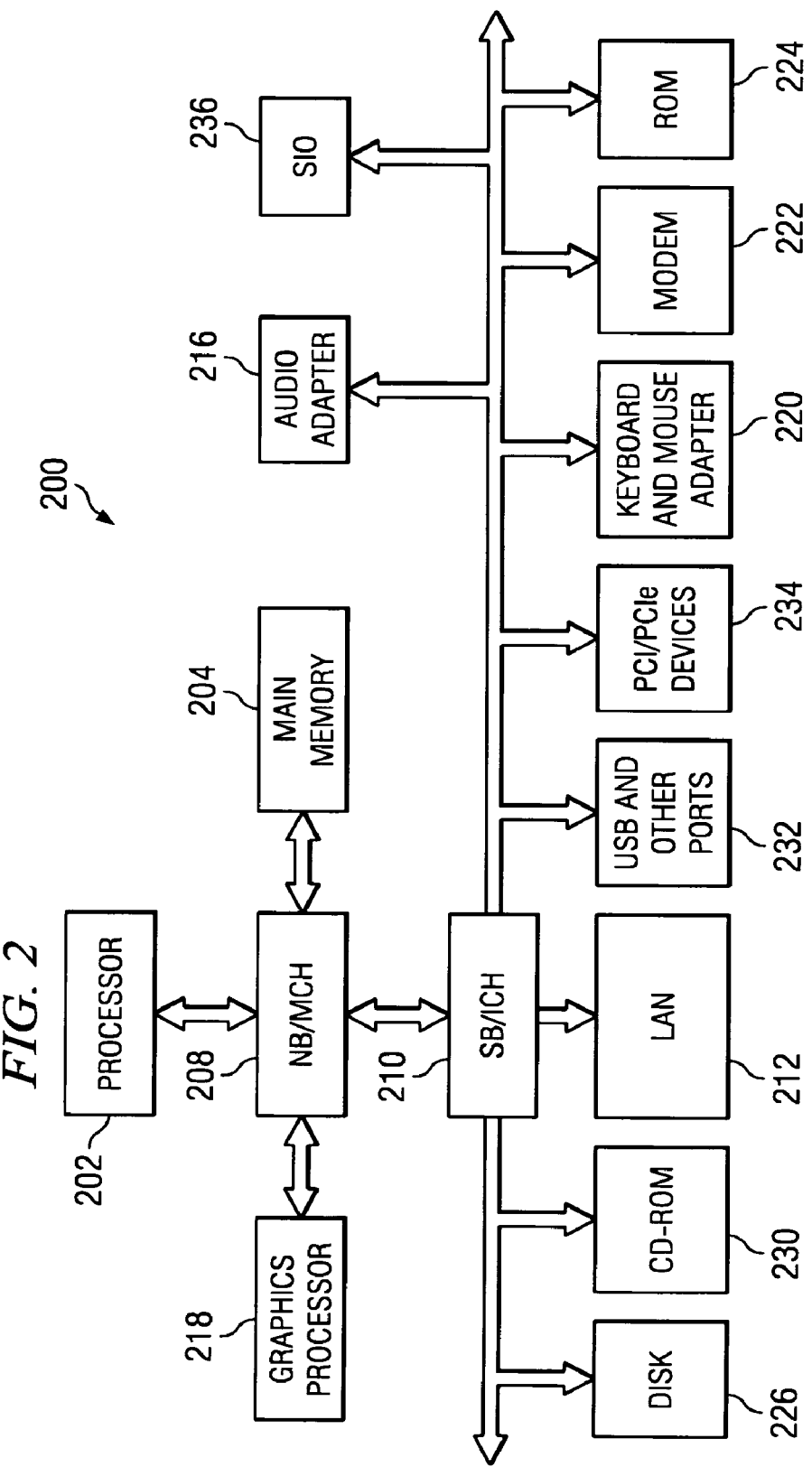
FIG. 2 is a block diagram of a data processing system in which the exemplary aspects of the present invention may be implemented.

A method, apparatus and computer program product for parsing a Chinese character stream are provided. The data processing device may be a distributed data processing system in which multiple computing devices are utilized to perform various aspects of the present invention. Therefore, the following FIGS. 1 and 2 are provided as exemplary diagrams of data processing environments in which the exemplary aspects of the present invention may be implemented. It should be appreciated that FIGS. 1 and 2 are only exemplary and are not intended to assert or imply any limitation with regard to the environments in which the exemplary aspects of the present invention may be implemented. Many modifications to the depicted environments may be made without departing from the spirit and scope of the exemplary embodiments described herein.

With reference now to the figures and in particular with reference to FIG. 1, a pictorial representation of a data processing system in which the exemplary aspects of the present invention may be implemented is depicted. A computer 100 is depicted which includes, for example, system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like.

Computer 100 may be implemented using any suitable computer, such as, for example, an IBM eServer computer or IntelliStation computer, which are products of International Business Machines Corporation, located in Armonk, N.Y. Although the depicted representation shows a computer, other embodiments of the exemplary aspects of the present invention may be implemented in other types of data processing systems, such as a network computer, for example. Computer 100 also may include, for example, a graphical user interface (GUI) that may be implemented by means of systems software residing in computer readable media in operation within computer 100.

With reference now to FIG. 2, a block diagram of a data processing system is shown in which the exemplary aspects of the present invention may be implemented. Data processing system 200 is an example of a computer, such as computer 100 in FIG. 1, in which code or instructions implementing the exemplary processes of the present invention may be located. In the depicted example, data processing system 200 employs, for example, a hub architecture including a north bridge and memory controller hub (MCH) 208 and a south bridge and input/output (I/O) controller hub (ICH) 210. Processor 202, main memory 204, and graphics processor 218 are connected to MCH 208 in the depicted example. Graphics processor 218 may be connected to the MCH through an accelerated graphics port (AGP), for example.

In the illustrated example, local area network (LAN) adapter 212, audio adapter 216, keyboard and mouse adapter 220, modem 222, read only memory (ROM) 224, hard disk drive (HDD) 226, CD-ROM driver 230, universal serial bus (USB) ports and other communications ports 232, and PCI/PCIe devices 234 may be connected to ICH 210. PCI/PCIe devices may include, for example, Ethernet adapters, add-in cards, PC cards for notebook computers, etc. PCI uses a cardbus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to ICH 210.

An operating system runs on processor 202 and is used to coordinate and provide control of various components within data processing system 200 in FIG. 2. The operating system may be, for example, a commercially available operating system such as the WINDOWS XP operating system, which is available from Microsoft Corporation. An object oriented programming system, such as the JAVA programming language, may run in conjunction with the operating system and provides calls to the operating system from JAVA programming language programs or applications executing on data processing system 200. "JAVA" is a trademark of Sun Microsystems, Inc. Instructions for the operating system, the object-oriented programming system, and applications or programs are located on storage devices, such as hard disk drive 226, and may be loaded into main memory 204 for execution by processor 202. The exemplary processes of the present invention may be performed by processor 202 using computer implemented instructions, which may be located in a memory such as, for example, main memory 204, memory 224, or in one or more peripheral devices 226 and 230.

Those of ordinary skill in the art will appreciate that the hardware in FIG. 2 may vary depending on the implementation. Other internal hardware or peripheral devices, such as flash memory, equivalent non-volatile memory, or optical disk drives and the like, may be used in addition to or in place of the hardware depicted in FIG. 2. Also, the exemplary aspects of the present invention may be applied to a multiprocessor data processing system.

Figure 5:
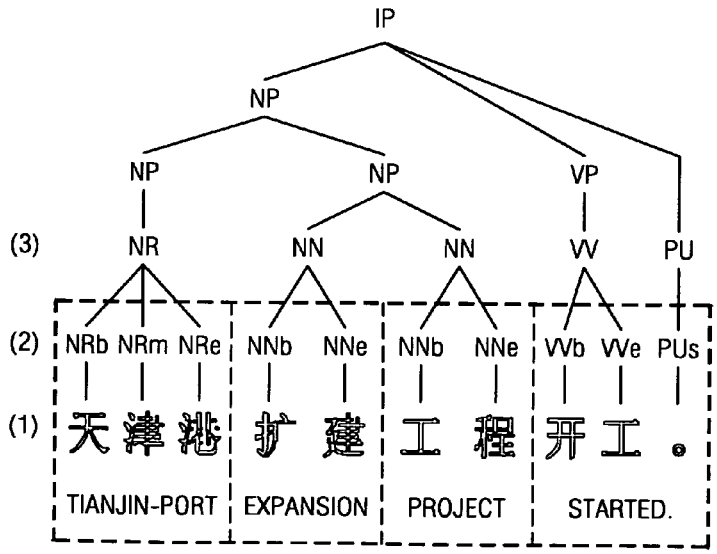
FIG. 5 illustrates an example character-level parse tree in accordance with an exemplary embodiment of the present invention.

In accordance with the exemplary aspects of the present invention, a system is provided that takes as input Chinese character streams and outputs one or multiple parse trees that contain syntactic analysis of the input. An example input may be line (1) of FIG. 5 and the output may be the parse tree in FIG. 5 shown in level (1) and the above structure.

Figure 3:
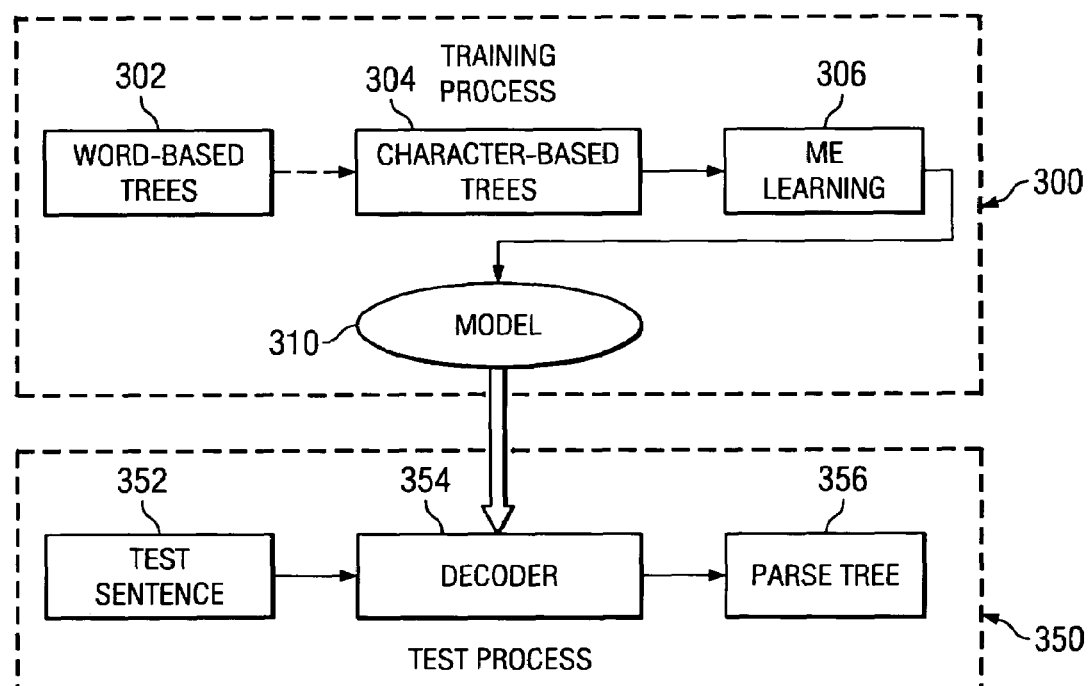
FIG. 3 illustrates an overall system structure in accordance with the exemplary aspects of the present invention.

FIG. 3 illustrates an overall system structure in accordance with the exemplary aspects of the present invention. Once a corpus of character-based parse trees is available, the system uses the maximum-entropy (ME) method to train a parser. See Ratnaparkhi, "A Linear Observed Time Statistical Parser Based on Maximum Entropy Models," *Second Conference on Empirical Methods in Natural Language Processing*, pages 1-10, herein incorporated by reference. In training process 300, if a corpus of word-based trees 302 in a corpus of training data are pre-segmented and parsed, the word-based trees 302 are converted to character-based trees 304. Otherwise, a corpus of character-based trees must be manually segmented and parsed to form training data. Training the parser using ME learning 306 results in model 310.

The character-based parser can be used at the character level, whereas a word-based parser requires a separate word-segmenter. The availability of Chinese Treebank (CTB), a large corpus with high quality syntactic annotations, allows the system to accurately perform word-segmentation, part-of-speech (POS) tagging, and constituent labeling at the same time. Since syntactical information directly influences word-segmentation in the character-based parser, the CTB corpus allows testing of whether or not syntactic information is useful for word-segmentation. Chinese words are more or less an open concept and the out-of-vocabulary (OOV) word rate is high. As morphology of the Chinese language is limited, extra care is needed to model unknown words when building a word-based model. Chinese characters, on the other hand, are almost closed. Therefore, the character-based OOV rate is much lower than the word-based OOV rate.

CTB is manually segmented and is tokenized at the word level. To build a Chinese character parser, one must first convert the word-based parse trees into character-based trees. A few simple rules are employed in this conversion to encode word boundary information:

1. Word-level POS tags become labels in character trees.
2. Character-level tags are inherited from word-level POS tags after appending a positional tag.
3. For single-character words, the positional tag is "s" for "single". For multiple-character words, the first character is appended with a positional tag "b" for "beginning," the last character is appended with a positional tag "e" for "ending," and all middle characters are appended with a positional tag "m" for "middle."

Figure 4:
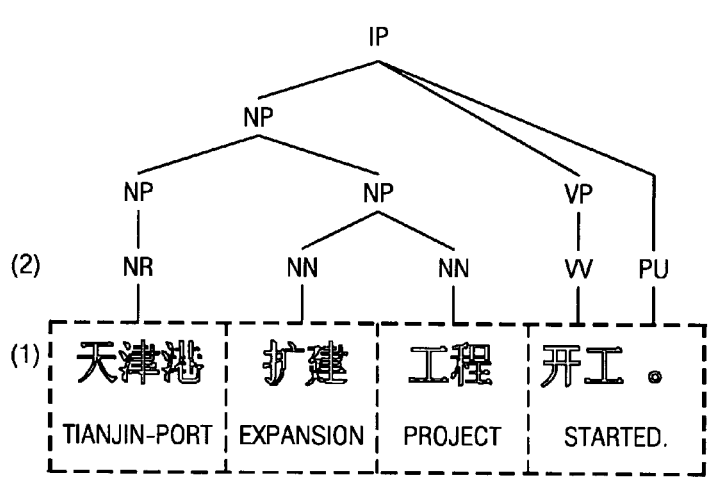
FIG. 4 illustrates an example word-level parse tree.

FIG. 4 illustrates an example word-level parse tree. The Chinese character stream on line (1) is given word-level POS tags, as shown on line (2) of the parse tree. In accordance with the exemplary aspects of the present invention, the word-level parse tree is converted to a character-level parse tree. These word-level POS tags are used as labels for the constituent characters in the character-level.

FIG. 5 illustrates an example character-level parse tree in accordance with an exemplary embodiment of the present invention. Note that the word-level POS "NR" becomes a label of the constituent characters "天津港"The character-level tags of the constituent characters "天津港"are the lower-case word-level POS tag plus a positional letter. Thus, the first character "天"is assigned the tag "nrb" where "nr" is from the word-level POS tag and "b" denotes the beginning character. The second (middle) character "津"has the positional letter "m," signifying that it is in the middle position. The last character "港" has the positional letter "e," denoting that the character is at the end of the word. Other words in the sentence are mapped in a similar manner. After the mapping, the number of terminal tokens of the character tree is larger than that of the word tree.

The character-level tags clearly encode word boundary information and chunk-level labels are word-level POS tags. A chunk is defined as a constituent whose children are all preterminals. Therefore, parsing a Chinese character sentence effectively results in word-segmentation, POS-tagging, and construction of syntactic structure at the same time.

The maximum entropy parser offers the flexibility of integrating multiple sources of knowledge into a model. The maximum entropy model decomposes P(T|S), the probability of a parse tree T given a sentence S, into the product of probabilities of individual parse actions, i.e., $$\prod_{i=1}^{N_T} P(a_i \mid S, a_1^{(i-1)}).$$

The parse actions $\alpha_1^{N_T}$ are an ordered sequence, where $N_T$ is the number of actions associated with the parse T. The mapping from a parse tree to its unique sequence of actions is one-to-one. Each parse action is either tagging a word, chunking tagged words, extending an existing constituent to another constituent, or checking whether an open constituent should be closed. Each component model takes the exponential form:

$$P(a_i \mid S, a_1^{(i-1)}) = \frac{\exp\left[\sum_k \lambda_k g_k(S, a_1^{(i-1)}, a_i)\right]}{Z(S, a_1^{(i-1)})}$$

where $Z(S,\alpha_1^{(i-1)})$ is a normalization term to ensure that $P(\alpha_i|S,\alpha_1^{(i-1)})$ is a probability, $g_k(S,\alpha_1^{(i-1)},\alpha_i)$ is a feature function (often binary), and $\lambda_k$ is the weight of $g_k$.

Given a set of features and a corpus of training data, efficient training algorithms exist for finding the optimal parameters $\{\lambda_k\}$. The art of building a maximum entropy parser then reduces to choosing "good" features. Features may be broken into two categories. The first set of features is derived from predefined templates. When these templates are applied to training data, features are generated automatically. Since these templates can be used in any language, features generated this way are referred to as language-independent features. The second category of features incorporates lexical information into the model and is primarily designed to improve word-segmentation. This set of features is language-dependent because a Chinese word dictionary is required.

The maximum entropy parser parses a sentence in three phases. First, the parser tags the input sentence. Multiple tag sequences are kept in the search heap for processing in later stages. Then, tagged tokens are grouped into chunks. It is possible that a tagged token is not in any chunk. Finally, a chunked sentence, consisting of a forest of many subtrees, is then used to extend a subtree to a new constituent or join an existing constituent. Each extending action is followed by a checking action that decides whether or not to close the extended constituent. In general, when a parse action $\alpha_i$ is carried out, the context information, i.e., the input sentence S and preceding parse actions $\alpha_1^{(i-1)}$, is represented by a forest of subtrees. Feature functions operate on the forest context and the next parse action. They are all of the form:

$$g_k((S, \alpha_1^{(i-1)}), \alpha_i) = h_k(S, \alpha_1^{(i-1)}) \delta(\alpha_i = \alpha_k),$$

where $h_k(S,\alpha_1^{(i-1)})$ is a binary function on the context.

Some notations are needed to present features. $w_n$ denotes an input terminal token, $t_n$ denotes its tag (preterminal), $c_n$ is a chunk, and $e_n$ denotes a constituent label, where the index n is relative to the current subtree. The subtree immediately left to the current subtree is indexed as −1, the second left to the current subtree is indexed as −2, the subtree immediately to the right is indexed as 1, and so on. $d_{n,l}$ represents the root label of the $l^{th}$-child of the $n^{th}$ subtree. If l<0, the child is counted from the right.

In the tag model, the context consists of a window of five tokens—the token being tagged and two tokens to its left and right—and two tags on the left of the current word. The feature templates are tabulated in Table 1 (to save space, templates are grouped), as follows:

TABLE 1

| Index | Template (context, future) |
|---|---|
| 1 | $w_n, t_0 (n = -2, -1, 0, 1, 2)$ |
| 2 | $w_n w_{n+1}, t_0 (n = -1, 0)$ |
| 3 | $w_n w_{n+1} w_{n+2}, t_0 (n = -2, -1, 0)$ |
| 4 | $t_{-1}, t_0$ |
| 5 | $t_{-2} t_{-1}, t_0$ |

Tag feature templates: $w_n(n=-2,-1,0,1,2)$: current token (if n=0) or $|n|^{th}$ token on the left (if n<0) or right (if n>0), $t_n(n=-2,-1,0,1,2)$: tag.

At training time, feature templates are instantiated by the training data. For example, when the template "$w_{-1}, t_0$" is applied to the first character of the sample sentence in line (1) of FIG. 5, a feature $g(w_{-1}=*BOUNDARY*, t_0=nrb)$ is generated. Note that $w_{-1}$ is the token on the left and, in this case, the boundary of the sentence. The template "$w_0, t_0$" is instantiated similarly as $g(w_0=天\ t_0=nrb)$.

As character-level tags have encoded the chunk label information and the uncertainty about a chunk action is low, given character-level tags, the chunk concept is limited to a window of three subtrees—the current subtree plus its left and right subtree. $c_n$ in Table 2 below denotes the label of the $n^{th}$ subtree if it is not a chunk, or the chunk label plus the tag of its right-most child if it is a chunk.

TABLE 2

| Index | Template (context, future) |
|---|---|
| 1 | $c_n, a_0 (n = -1, 0, 1)$ |
| 2 | $c_n c_{n+1}, a_0 (n = -1, 0)$ |

Chunk feature templates: $c_n(n=-1,0,1)$ is the chunk label plus the tag of its right-most child if the $n^{th}$ tree is a chunk; otherwise, $c_n$ is the constituent label of the $n^{th}$ tree.

Again, using the sentence in line (1) of FIG. 5, assume that the current forest of subtrees is "(NR 天/nrb 津/nrm 港/nre) 扩/nnb 建/nne 工/nnb 程/nne 开/vvb 工/vve °/pus, and the current subtree is "扩/nnb," then instantiating the template $c_{-1}, \alpha_0$ would result in a feature $g(c_{-1}=NR:nre, \alpha_0=chunkNN)$.

TABLE 3

| Index | Template (context,future) |
|---|---|
| 1 | $e_{-1}e_n, a_0(n = 0, 1, 2)$ |
| 2 | $e_{-1}d_{(-1,-n)}, a_0(n = 1, 2)$ |
| 3 | $e_{-1}e_0e_1$ |
| 4 | $e_{-1}d_{(-1,01)}e_0, a_0$ |
| 5 | $e_{-1}d_{(-1,-1)}, e_0, e_1, a_0$ |
| 6 | $e_{-1}d_{(-1,-1)}, d_{(-1,-2)}, a_0$ |

Extend feature templates: $e_n(n=-1,0,1,2)$ is the root constituent label of the $n^{th}$ subtree (relative to the current subtree); $d_{(-1,-n)}(n=1,2)$ is the label of the $n^{th}$ right-most child of the previous subtree.

Extend features depend upon a previous subtree and the two following subtrees. Some features use child labels of the previous subtree. For example, the interpretation of the template on line 4 of Table 3 is that $e_{-1}$ is the root label of the previous subtree, $d_{(-1,-1)}$ is the right-most child of the previous tree, and $e_0$ is the root label of the current subtree.

Most of the check feature templates again use constituent labels of the surrounding subtrees. The template on line 1 of Table 4 is unique to the check model. The template essentially looks at children of the current constituent, which is intuitively a strong indication of whether or not the current constituent should be closed.

TABLE 4

| Index | Template (context, future) |
|---|---|
| 1 | $e_0 \rightarrow d_{0,1} \ldots d_{0,n_d}, a_0$ |
| 2 | $e_{0,-1}, a_0$ |
| 3 | $e_0d_{0,i}, a_0(i = 1, 2, \ldots, n_d)$ |
| 4 | $e_{-1}, a_0$ |
| 5 | $e_1, a_0$ |
| 6 | $e_{-2}e_{-1}, a_0$ |
| 7 | $e_1e_2, a_0$ |

Check feature templates: $e_n(n=-1,0,1,2)$ is the constituent label of the $n^{th}$ subtree (relative to the current subtree). $d_{(0,i)}$ is the $i^{th}$ child label of the current constituent.

The model described above does not depend upon any Chinese word dictionary. All features derived form the templates described above are extracted from training data. A problem that arises is that words not seen in training data may not have "good" features associated with them. Fortunately, the maximum entropy framework makes it relatively easy to incorporate other sources of knowledge into the model. In accordance with the exemplary aspects of the present invention, a set of language-dependent features, primarily for Chinese word segmentation, are incorporated into the model.

The language-dependent features are computed from a word list and training data. Let L be a list of Chinese words, where characters are separated by spaces. At the time of tagging characters (recall word-segmentation information is encoded in character-level tags), characters may be tested within a window of five (that is, two characters to the left and two characters to the right) to determine whether a character either starts, occurs in any position of, or ends any word on the list L. The feature templates are summarized in Table 5. $b(w_n,L)$ tests if the character $w_n$ starts any word on the list L. Similarly, $m(w_n,L)$ tests if the character $w_n$ occurs in any position in any word on the list L. $e(w_n,L)$ tests if the character $w_n$ is in the last position of any word on the list L.

TABLE 5

| Index | Template (context, future) |
|---|---|
| 1 | $b(w_n, L), t_0(n = -2, -1, 0, 1, 2)$ |
| 2 | $m(w_n, L), t_0(n = -2, -1, 0, 1, 2)$ |
| 3 | $e(w_n, L), t_0(n = -1, -2, 0, 1, 2)$ |

A word list may be collected to encode different semantic or syntactic information. For example, a list of location names or personal names may help the model to identify unseen city or personal names. A closed list of functional words may be collected to represent a particular set of words sharing a POS. These types of features improve the model robustness since unseen words will share features fired for seen words. Even if a relatively small word-list significantly improves the word-segmentation accuracy.

Returning to FIG. 3, after model 310 is built, decoder 354 parses Chinese sentences into a character-based parse trees using model 310. In training process 350, decoder 354 takes test sentence 352 that is a Chinese character stream, such as the sentence shown in line (1) of FIG. 4, and outputs one or more parse trees 356. Decoder 354 may accept input with partial analysis. For example, a user may specify that the first three characters of the sentence in line (1) of FIG. 4 is a noun phrase (NP) and the decoder will respect the constraint and make sure that all the output are consistent with the constraint.

Figure 6:
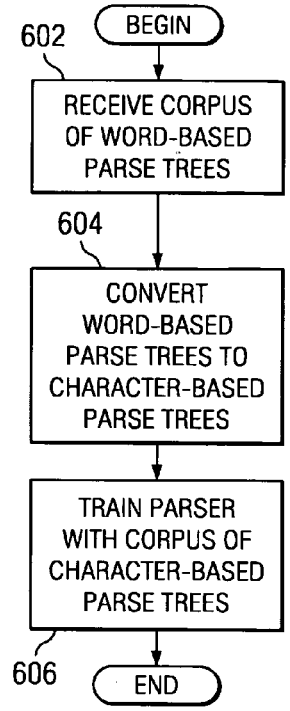
FIG. 6 is a flowchart illustrating the operation of training a character-based parser in accordance with the exemplary aspects of the present invention.

FIG. 6 is a flowchart illustrating the operation of training a character-based parser in accordance with the exemplary aspects of the present invention. The process begins and receives a corpus of word-based parse trees (block 602). The process then converts the word-based parse trees to character-based parse trees (block 604) to form a set of training data. Then, the process trains the parser with the corpus of character-based parse trees (block 606) to form a model for a decoder. In accordance with exemplary aspects of the present invention, the training process uses maximum entropy methods, as discussed above, because a maximum entropy parser offers the flexibility of integrating multiple sources of knowledge into a model. Thereafter, the process ends.

Figure 7:
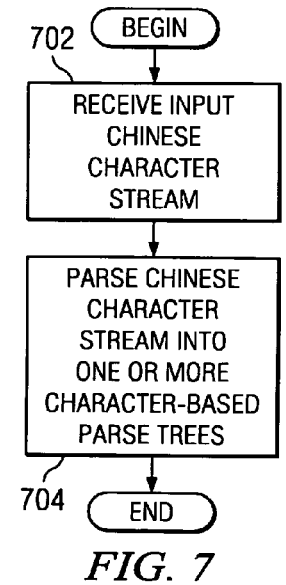
FIG. 7 is a flowchart illustrating the operation parsing an input character stream into one or more character-based parse trees in accordance with the exemplary aspects of the present invention.

FIG. 7 is a flowchart illustrating the operation parsing an input character stream into one or more character-based parse trees in accordance with the exemplary aspects of the present invention. The process begins and receives an input Chinese character stream (block 702). While the exemplary embodiments apply to Chinese language character streams, the principals of the invention are also applicable to other Eastern Asian languages, such as Japanese and Korean, that have the same word segmentation problems. The process then parses the Chinese character stream into one or more character-based trees (block 704) based on a model. Thereafter, the process ends.

Thus, the exemplary aspects of the present invention solve the disadvantages of the prior art by providing one or more character-based parse trees that can be used directly in natural language applications operating at the character level, whereas word-based parsers require a separate word-segmenter. The character-based parser may also make use of the syntactic constraints of pre-segmented training data when determining word boundaries, thus providing a more effective and accurate result.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for parsing Eastern Asian language character streams, the method comprising:
   receiving a corpus of word-based parse trees, wherein each word-based parse tree in the corpus of word-based parse trees includes a word part-of-speech tag for each word in the word-based parse tree;
   converting the corpus of word-based parse trees into a corpus of character-based parse trees, wherein converting the corpus of word based parse trees includes assigning a word position tag to each character in the character-based parse tree based on the corresponding word part-of-speech tag for each word in the word-based parse tree; and
   training a parser using the corpus of character-based parse trees, wherein the character-based parser is used at a character level, and wherein the character-based parser does not require a separate word-segmenter.

2. The method of claim 1, wherein the word position tag is one of a beginning tag, a middle tag, and an end tag.

3. The method of claim 1, wherein training the parser includes forming a model.

4. The method of claim 3, further comprising:
   providing the model to a decoder, wherein the decoder parses Eastern Asian language character streams at a character level using the model.

5. The method of claim 4, further comprising:
   receiving a test sentence, wherein the test sentence is an Eastern Asian language character stream; and
   parsing the test sentence using the decoder to form one or more character-based parse trees.

6. The method of claim 1, wherein training the parser includes training the parser using maximum-entropy method.

7. The method of claim 1, wherein the Eastern Asian language is one of Chinese, Japanese, and Korean.

8. The method of claim 1, wherein the corpus of word-based parse trees is a Chinese Treebank.

9. An apparatus for parsing Eastern Asian language character streams, the apparatus comprising:
   means for receiving a corpus of word-based parse trees, wherein each word-based parse tree in the corpus of word-based parse trees includes a word part-of-speech tag for each word in the word-based parse tree;
   means for converting the corpus of word-based parse trees into a corpus of character-based parse trees, wherein converting the corpus of word based parse trees includes assigning a word position tag to each character in the character-based parse tree based on the corresponding word part-of-speech tag for each word in the word-based parse tree; and
   means for training a parser using the corpus of character-based parse trees, wherein the character-based parser is used at a character level, and wherein the character-based parser does not require a separate word-segmenter.

10. A recordable-type medium encoding a compueter program product, in a computer readable medium, for parsing Eastern Asian language character streams, the method comprising:
    instructions for receiving a corpus of word-based parse trees, wherein each word-based parse tree in the corpus of word based parse trees includes a word part-of-speech tag for each word in the word-based parse tree;
    instructions for converting the corpus of word-based parse trees into a corpus of character-based parse trees, wherein converting the corpus of word based parse trees includes assigning a word position tag to each character-based parse tree based on the corresponding word part-of-speech tag for each word-based parse tree; and
    instructions for training a parser using the corpus of character-based parse trees, wherein the character-based parser is used at a character level, and wherein the character-based parser does not require a separate word-segmenter.

11. The recordable-type medium encoding the computer program product of claim 10, wherein the word position tag is one of a beginning tag, a middle tag, and an end tag.

12. The recordable-type medium encoding the computer program product of claim 10, wherein the instructions for training the parser includes instructions for forming a model.

13. The recordable-type medium encoding the computer program product of claim 12, further comprising:
    instructions for providing the model to a decoder, wherein the decoder parses Eastern Asian language character streams at a character level using the model.

14. The recordable-type medium encoding the computer program product of claim 13, further comprising:
    instructions for receiving an input sentence, wherein the input sentence is an Eastern Asian language character stream; and
    instructions for parsing the input sentence using the decoder to form one or more character-based parse trees.

15. The recordable-type medium encoding the computer program product of claim 10, wherein the instructions for training the parser includes instructions for training the parser using maximum-entropy method.

16. The recordable-type medium encoding the computer program product of claim 10, wherein the Eastern Asian language is one of Chinese, Japanese, and Korean.

* * * * *